United States Patent [19]

Pirro, Jr.

[11] 4,238,029
[45] Dec. 9, 1980

[54] ACCUMULATING CONVEYOR

[76] Inventor: Michael S. Pirro, Jr., 9804 Butternut Dr., Crystal Lake, Ill. 60014

[21] Appl. No.: 918,512

[22] Filed: Jun. 23, 1978

[51] Int. Cl.³ ............................................ B65G 13/06
[52] U.S. Cl. ................................... 198/781; 198/789
[58] Field of Search ....................... 198/781, 789–791, 198/787

[56] References Cited

U.S. PATENT DOCUMENTS

| 3,612,248 | 10/1971 | Wallis | 198/781 |
|---|---|---|---|
| 3,939,962 | 2/1976 | Gebhardt | 198/781 |
| 4,091,916 | 5/1978 | Warner | 198/790 |
| 4,103,769 | 8/1978 | Jorgensen | 198/781 |
| 4,108,303 | 8/1978 | Vogt et al. | 198/781 |
| 4,108,304 | 8/1978 | McKnight et al. | 198/781 |

Primary Examiner—Joseph E. Valenza
Attorney, Agent, or Firm—Fitch, Even, Tabin, Flannery & Welsh

[57] ABSTRACT

An accumulating conveyor is disclosed which employs a plurality of article carrying rollers defining a plurality of accumulating zones arranged along the conveyor. Clutch wheels disposed along the length of the conveyor are continuously rotated by drive belt means and are mounted for pivotal movement between driving positions wherein each clutch wheel engages at least one carrier roller in driving relation therewith and second nondriving positions spaced from the associated carrier rollers. At least one article sensor is mounted within each zone and controls pivotal movement of the clutch wheels in the next adjacent upstream zone so that stoppage of an article in any zone will effect disengagement of the clutch wheels in the adjacent upstream zone with substantially zero pressure engagement between accumulated articles on the conveyor.

20 Claims, 7 Drawing Figures

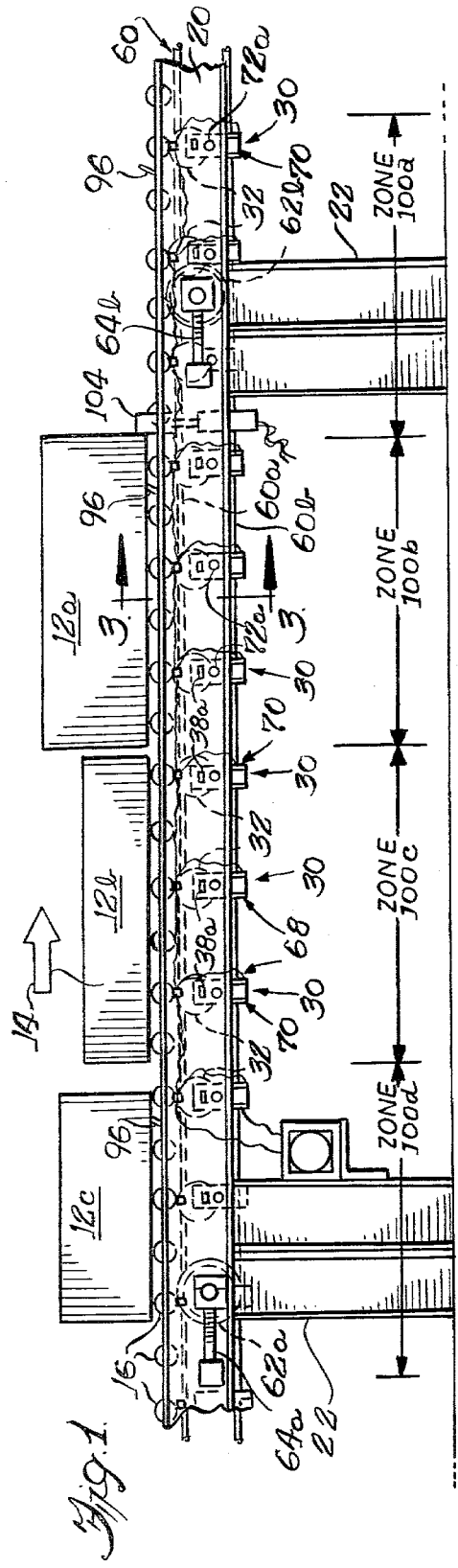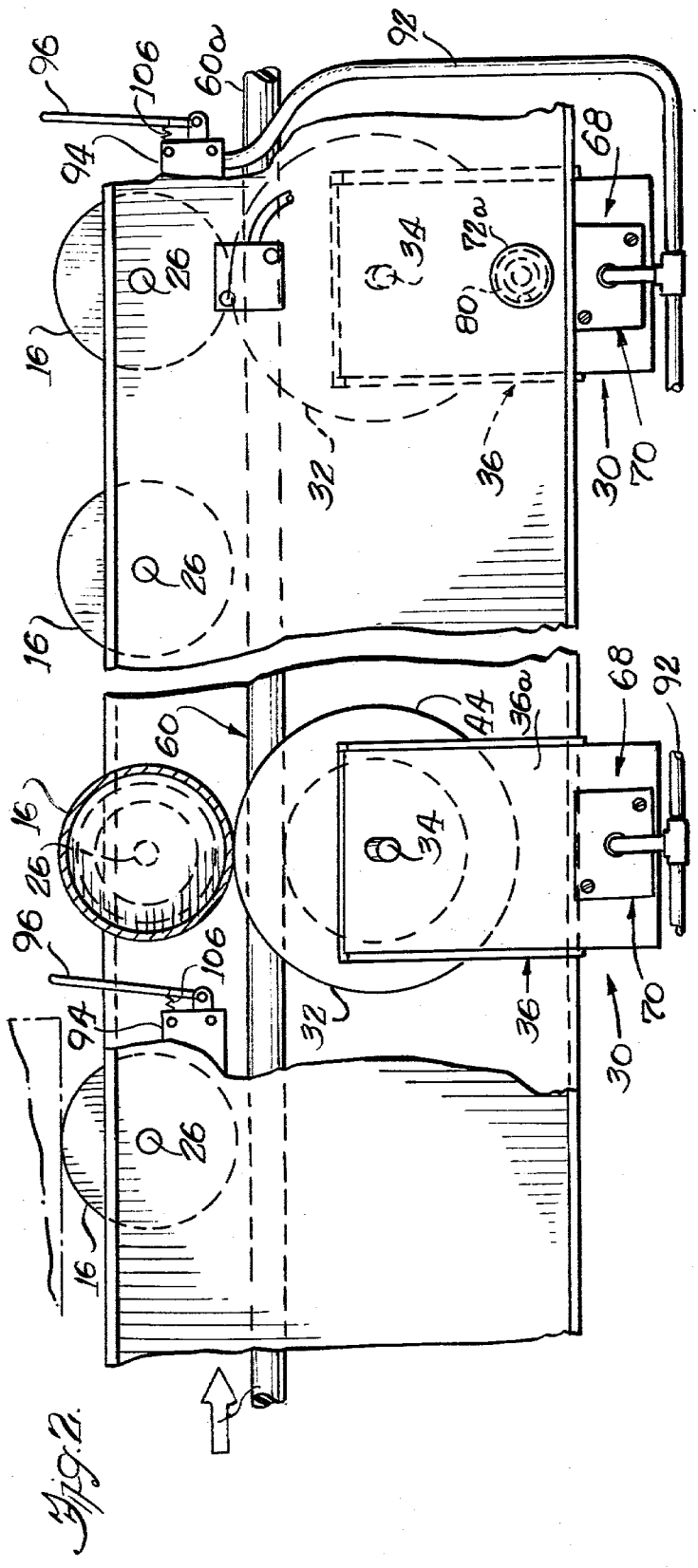

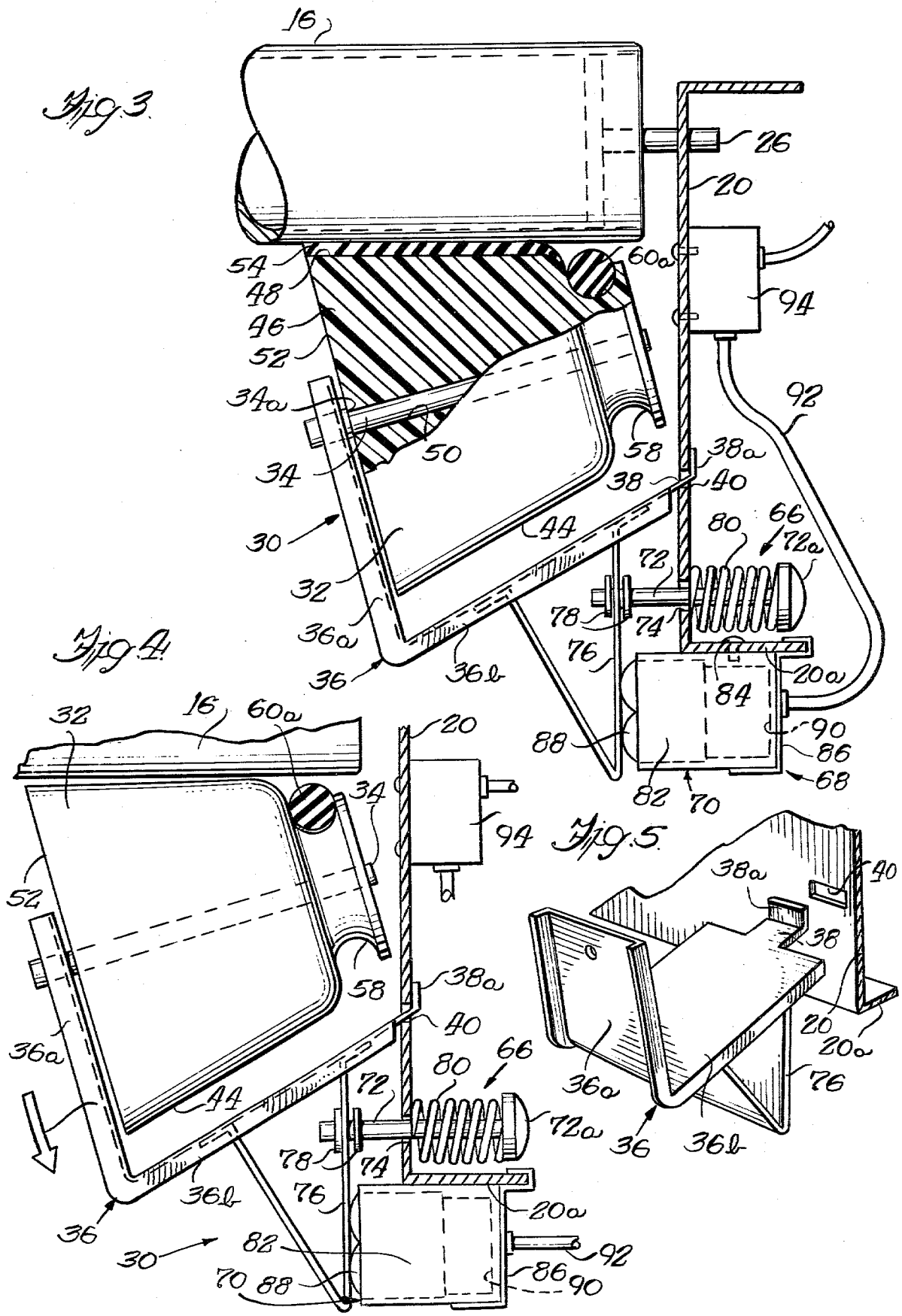

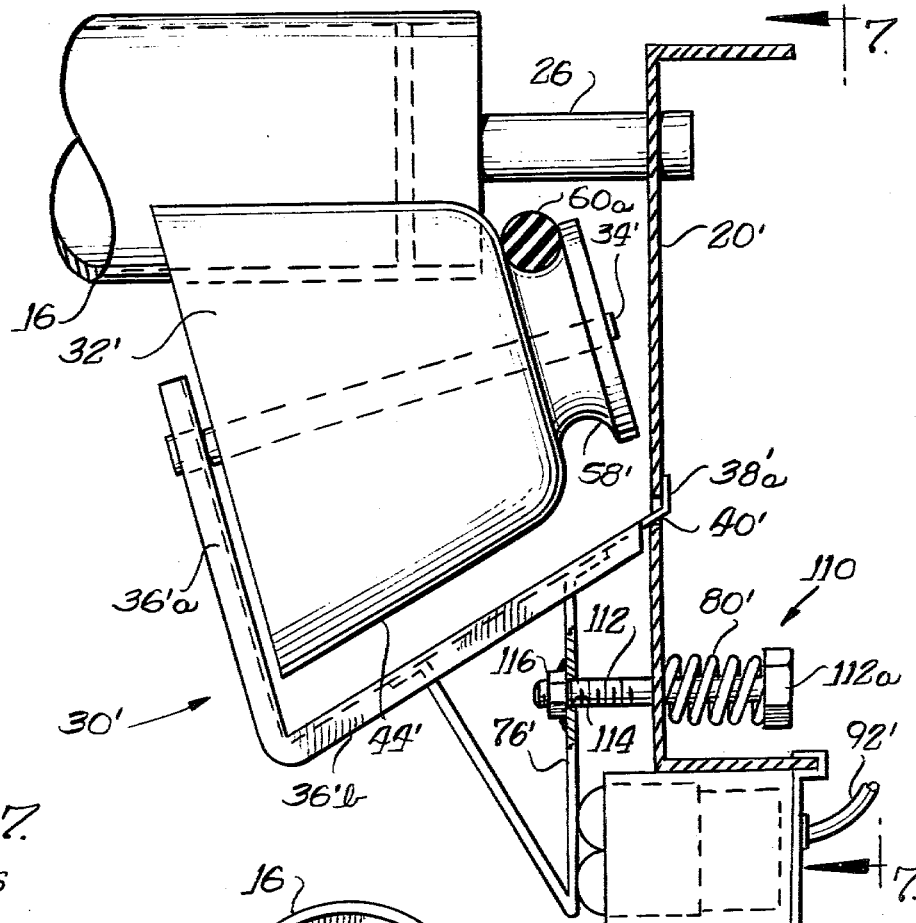
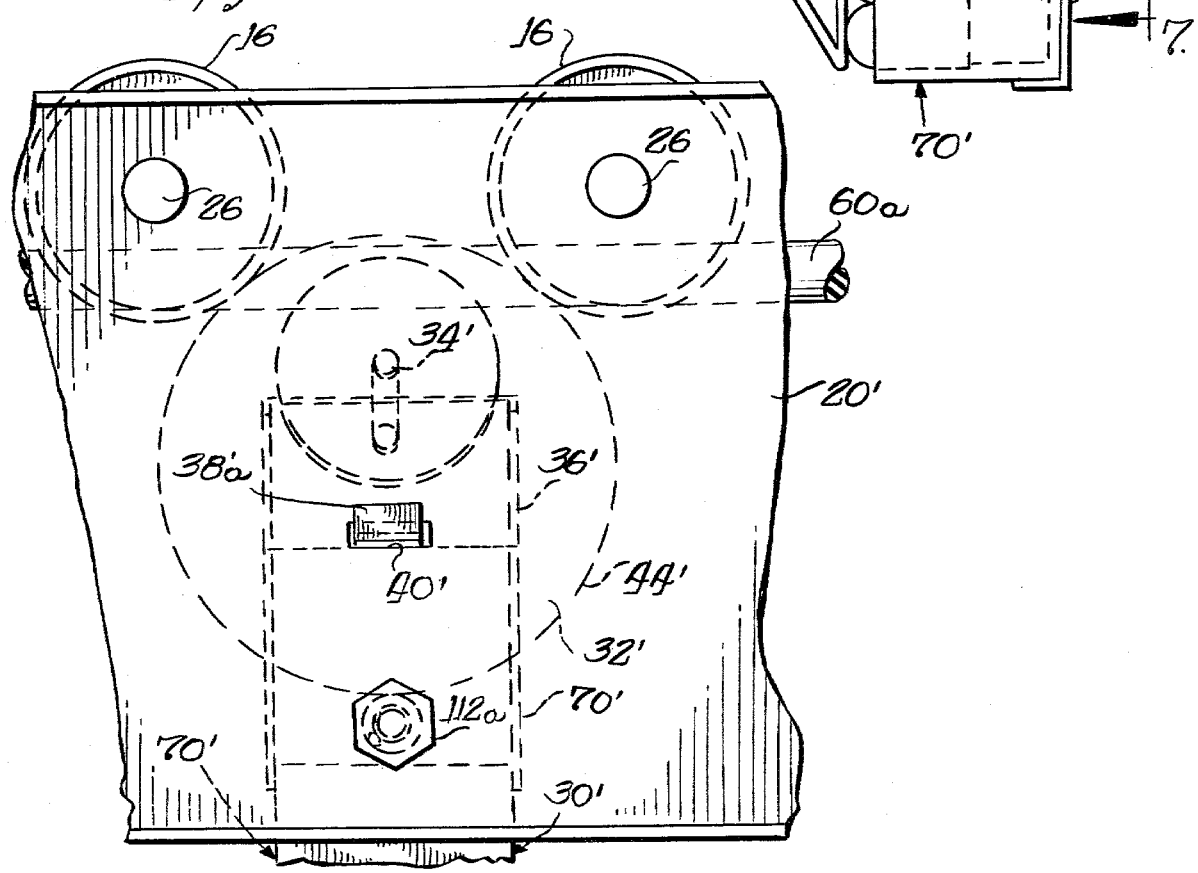

ACCUMULATING CONVEYOR

The present invention relates generally to power driven accumulator conveyors, and more particularly to an accumulator conveyor employing article carrying rollers and novel clutch wheels each of which is continually rotated and is pivotally movable between a driving position engaging at least one carrier roller and a nondriving position spaced from the associated roller through article sensor control means so that substantially zero pressure engagement is effected between accumulated articles on the conveyor upstream from a nonmoving article.

Power driven accumulator conveyors capable of conveying articles along a predetermined path so that very low or substantially zero pressure engagement is effected between adjacent articles accumulated on the conveyor when movement of one or more of the articles is impeded, are generally known. Conventionally, such accumulator conveyors are known as "zero pressure" accumulators and have sections or zones along the length of the accumulator each of which has a plurality of article supporting and carrying rollers adapted to be rotatably driven independently of the rollers of other zones so as to facilitate controlled movement of articles on the various zones. Each zone generally has one or more sensors thereon adapted to sense the presence of an article on the corresponding zone so that when advancing movement of an article on a particular zone is slowed down or significantly impeded, one or more sensors is activated to deactivate the driven carrier rollers in one or more zones upstream on the conveyor from the impeded article so as to prevent excessive or damaging pressure engagement between adjacent accumulated articles on the conveyor.

In general, the known accumulator conveyors of the aforenoted type employ endless drive means in the form of a driven belt which is caused to engage the article support and carrier rollers in driving rotation therewith. The drive belt may be controlled so as to undergo intermittent movement in response to article sensors on the conveyor, or may be adapted for movement out of engagement with the carrier rollers in response to impeded movement of one or more articles on the conveyor. See, for example, U.S. Pat. No. 3,768,630 which discloses an accumulator conveyor employing a continuously driven flat drive belt which is moved between driving and nondriving engagement with article carrier rollers disposed within different zones along the conveyor in response to article detecting sensors on the conveyor. Another example of an accumulator conveyor employing a continuously driven drive belt which is normally maintained in direct driving engagement with article support and carrier rollers but which may be moved to a nondriving position spaced from the carrier rollers is disclosed in U.S. Pat. No. 3,967,718.

Virtually all of the known power driven accumulator conveyors adapted to effect selective driving rotation of zones of article support and carrier rollers so that low or substantially zero pressure engagement is effected between accumulated articles on the conveyor employ relatively complex structures and are therefore relatively expensive to manufacture and service.

One of the primary objects of the present invention is to provide a novel power driven accumulator conveyor which employs relatively simple and inexpensive means for controlling driving rotation of article support and carrier rollers in different zones along the length of the conveyor so as to effect substantially zero pressure engagement between articles accumulated on the conveyor.

A more particular object of the present invention is to provide an accumulator conveyor employing a plurality of clutch wheels arranged in discrete zones along the length of the conveyor, each clutch wheel being continuously rotated during operation of the conveyor and being pivotally movable with other clutch wheels in the corresponding zone between driving and nondriving relation with associated article carrier rollers in response to actuation of at least one article sensor located within a different zone from that which the sensor controls.

Another object of the present invention is to provide an accumulator conveyor employing novel frustoconical shaped clutch wheels which are continually rotatably driven by drive belt means during operation of the conveyor, and which are pivotally movable between nondriving and driving relation with article carrying rollers on the conveyor without causing engagement of the drive belt means with the article carrying rollers.

A feature of the accumulator conveyor in accordance with the present invention lies in the provision of novel clutch wheels for effecting selective driving rotation of article carrier rollers disposed in discrete contiguous zones along the length of the conveyor, each clutch wheel being rotatably supported on a clutch bracket which is mounted for pivotal movement between a position wherein the clutch wheel is spaced from associated carrier rollers and a position wherein the clutch wheel engages at least one article carrying roller in driving relation therewith, each clutch wheel being adapted to effect progressively increasing area contact with its associated carrier roller as it is pivotally moved into driving engagement therewith. Pivotal movement of the clutch wheels is effected by actuator means controlled by a sensor located in a zone on the conveyor different from the zone of the clutch wheels controlled thereby.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a fragmentary elevational view of a section of an accumulator conveyor constructed in accordance with the present invention;

FIG. 2 is a fragmentary side elevational view, on an enlarged scale, of a portion of the accumulator conveyor of FIG. 1, portions being broken away for clarity;

FIG. 3 is a fragmentary transverse sectional view, on an enlarged scale, taken substantially along line 3—3 of FIG. 1, looking in the direction of the arrows; the clutch wheel being illustrated in driving engagement with an associated article carrier roller;

FIG. 4 is a fragmentary sectional view similar to FIG. 3 but showing the clutch wheel in a nondriving position relative to the corresponding article carrier roller;

FIG. 5 is a fragmentary perspective view illustrating a representative clutch wheel support bracket and manner of pivotally mounting the same on the conveyor side frame;

FIG. 6 is a fragmentary transverse sectional view generally similar to FIG. 3 but illustrating an alternative manner of mounting a clutch wheel for cooperation with a pair of article carrier rollers; and FIG. 7 is a fragmentary side elevational view of the embodiment of FIG. 6, taken substantially along line 7—7 of FIG. 6, looking in the direction of the arrows.

Turning now to the drawings, and in particular to FIG. 1, a portion of an accumulator conveyor constructed in accordance with the present invention is indicated at 10. Very generally, the accumulator conveyor 10 is of the type adapted to convey a plurality of articles, cartons or packages, such as shown at 12a–c along the conveyor in the direction of the arrow 14 so that, should progress of one of the articles be impeded or interrupted either intentionally or unintentionally, the articles rearwardly or "upstream" from the stopped article will accumulate with very low or substantially zero pressure engagement between adjacent articles.

In carrying out the invention, a plurality of article supporting and carrying rollers are rotatably supported on a conveyor frame in parallel spaced relation transverse to the longitudinal axis of the conveyor. The rollers are arranged in discrete contiguous zones along the length of the conveyor, with the article carrier rollers of each zone being selectively rotatably driven by clutch wheels operatively controlled by actuator means in response to sensors disposed in different zones on the conveyor.

Each clutch wheel has a frustoconical peripheral drive surface and is rotatably mounted on a clutch bracket for pivotal movement between a position spaced from associated article carrier rollers and a position engaging at least one associated carrier roller in driving relation therewith. The clutch wheels are continually rotated by drive belt means and are adapted to effect progressively increasing area contact with the associated carrier rollers as they are moved into driving engagement therewith. A clutch spring assembly biases each clutch wheel toward its nondriving position. In the described embodiment, the actuator means for each clutch wheel comprises a pneumatically controlled actuator.

At least one article detecting sensor is disposed within each zone of the conveyor and operates a control valve interposed between a source of fluid pressure and the pneumatically controlled clutch wheel actuators in the adjacent upstream zone. When movement of an article on the conveyor is impeded, the sensor in the corresponding zone is actuated to release air pressure from the clutch wheel actuators in the next adjacent upstream zone so as to effect pivotal movement of the corresponding clutch wheels to nondriving positions whereby movement of articles on the conveyor is halted until the sensors are again returned to positions effecting return of the clutch wheels to driving relation with the associated carrier rollers.

The articles 12 are supported on and transferred along the conveyor by a plurality of article support and carrier rollers 16 rotatably supported by and between parallel conveyor side frame members, one of which is shown at 20. The side frame members 20 and carrier rollers 16 define the longitudinal axis of the conveyor and, correspondingly, the path of travel of articles along the conveyor. The side frame members 20 are supported in planar relation on the upper ends of upstanding standards 22 disposed in suitable spaced relation along the length of a conveyor so as to support the carrier rollers 16 at a desired height above floor level. It will be appreciated that the side frame members 20 may be supported by suitable means other than the support standards 22. Transverse frame members (not shown) maintain the side frame members 20 in fixed parallel spaced relation. In the illustrated embodiment the frame members 20 define a relatively straight section of the conveyor. As will become apparent herein, the frame members could be curved to define a curved conveyor section.

The article support and carrying rollers 16 may be of conventional design and each has an axial support shaft 26 the opposite ends of which extend outwardly from the ends of the associated support roller and are rotatable within suitable axially aligned pairs of openings spaced longitudinally along the spaced side frame members 20 so that the drive rollers 16 are disposed in parallel equidistantly spaced relation transverse to the longitudinal axis of the conveyor. The opposite ends of the roller support shafts 26 may be supported within suitable bearings (not shown) with the uppermost surfaces of the rollers 16 being tangent to a plane spaced above and parallel to the upper edge surfaces of the frame members 20.

In the embodiment illustrated in FIGS. 1–5, alternate ones of the article support and carrying rollers 16 are selectively rotatably driven to effect movement of articles along the conveyor. Driving of alternate rollers 16 will generally suffice under normal operating conditions to effect the desired movement of articles along the conveyor 10. However, in heavy duty application, such as where the articles being conveyed are of substantially heavier weight than under normal conditions, it may be desirable to drive all of the carrier rollers, as by driving each adjacent pair of article support rollers as will be described more fully below in connection with the embodiment illustrated in FIGS. 6 and 7.

With particular reference to FIGS. 2–5, each of the alternate driven article support and carrying rollers 16 has operative association with drive means, indicated generally at 30, operative to effect selective rotational movement of the driven carrier rollers. Each drive means 30 includes a clutch wheel 32 rotatably supported on a support shaft 34 for rotation about its longitudinal axis. Each support shaft 34 is mounted on an upstanding arm portion 36a of a clutch bracket 36 so as to extend outwardly from the arm 36a in substantially normal relation thereto. Each clutch bracket 36 is pivotally mounted on a common one of the conveyor side frame members 20 for pivotal movement about a hinge axis parallel to the longitudinal axis of the conveyor, the hinge axes of the clutch brackets being axially aligned along the length of the associated side frame member.

In the illustrated embodiment, each clutch bracket 36 is generally L-shaped with its upstanding arm portion 36a being formed integral with a second arm portion 36b which has its free end formed with a hinge tab 38 adapted to be received through a suitable rectangular opening 40 within the frame member 20 and retained therein by an upstanding retainer tab 38a. In this manner, each hinge bracket 36 is rotatable about a hinge axis lying substantially in the vertical plane of the side frame member 20. As best seen in FIG. 1, the openings 40 are equidistantly spaced along the length of the side frame member 20 so as to vertically underlie the rotational axes of alternate ones of the article support rollers 16.

In accordance with an important feature of the present invention, each clutch wheel 32 has a frustoconical peripheral drive surface 44 thereon adapted to progressively engage its associated article carrier roller 16 in increasing area contact therewith as the clutch wheel is moved from a nonoperating position spaced from the associated carrier roller, as illustrated in FIG. 4, to a position wherein the clutch wheel is in full driving engagement with the associated carrier roller, as illustrated in FIG. 3. In the preferred embodiment, each clutch wheel 32 comprises a suitable strength thermoplastic body 46 having a frustoconical peripheral surface area 48 and an axial bore 50 therethrough to receive the associated support shaft 34 in supporting relation therein. The support shaft 34 has an annular shoulder surface 34a formed thereon to maintain a planar end surface 52 of the associated clutch wheel spaced from the upstanding arm 36a of the associated clutch bracket 36. An annular coating or sleeve 54 is preferably formed on the frustoconical surface area 48 of the plastic body 46 and defines the peripheral drive surface 44. The coating or sleeve 54 is preferably formed of a suitable rubber material, such as commercially available under the tradename UNIROYAL TPR 1600, having a relatively high coefficient of friction and providing the desired frictional drive surface engagement with the associated carrier roller 16. Alternatively, the entire clutch wheel may be made of rubber material such as TPR 1600, thus eliminating the sleeve 54.

The thermoplastic body 46 of each clutch wheel 32 is formed with an annular drive belt receiving groove 58 contiguous to the frustoconical peripheral drive surface 44. Driving rotation of the clutch wheels 32 is effected by drive belt means which includes a drive belt 60 having a circular cross-sectional configuration and made from a nonelastic but flexible material suitable for use as a drive belt. Depending upon the length of the conveyor 10, the drive belt 60 may comprise a single drive belt or a plurality of drive belts each of which is adapted to service one or more operating zones. In the embodiment illustrated in FIG. 1, the drive belt 60 is reeved over support pulleys 62a and 62b which are suitably supported by the frame member 20 so that an upper reach 60a of the drive belt is received within the grooves 58 of all of the clutch wheels 32 disposed between pulleys 62a, b. The pulleys 62a, b are adjustable through conventional adjustment screws 64a, b, respectively, to permit adjustment of the axial tension in the drive belt. A return reach 60b of the drive belt 60 preferably passes below the various clutch brackets 36 disposed between support pulleys 62a, b. The drive belt 60 continually engages the associated clutch wheels 32 in driving relation therewith so that rotation of the clutch wheels is continuous when the drive belt 60 is driven. Suitable means (not shown) of conventional design are provided in operative association with one or both of the drive pulleys 62a, b so as to effect driving movement of the drive belt 60 and predetermined rotation of the clutch wheels. A feature of the invention is that the clutch wheels 32 are configured so that the drive belt 60 does not engage any of the article support rollers 16 during operation of the accumulator conveyor 10.

To effect selective movement of the clutch wheels 32 between operating and nonoperating positions relative to their associated article carrying rollers 16, each drive means 30 includes biasing means, indicated generally at 66, adapted to bias the respective clutch wheels toward their nonoperating positions, and actuator means, indicated generally at 68, operatively associated with each of the clutch brackets 36 and operative to move the associated clutch wheels from nonoperating positions spaced from their associated carrier rollers to positions engaging the associated carrier rollers in driving engagement therewith. As best seen in FIGS. 3 and 4, the biasing means 66 includes a control rod 72 having an enlarged head 72a at one end thereof and extending through a suitable opening 74 in the frame member 20 with the inner end of the control rod being fixed to a generally V-shaped bracket 76 by retaining rings 78 mounted on the control rod. Each bracket 76 is attached to the lower surface of the arm 36b of its associated clutch bracket 36. A coil compression spring 80, termed the clutch spring, is disposed coaxially over each control rod 72 with the opposite ends of the clutch spring engaging the inner surface of the control rod head 72a and the outer surface of the frame member 20 so as to bias the control rod 72 and associated clutch bracket 36 toward a position effecting disengagement of the corresponding clutch wheel 32 from its overlying carrier roller 16.

In the illustrated embodiment, the actuator means 68 includes a fluid pressure actuator 70 operable to overcome the biasing force of the associated clutch spring 80 and move the clutch bracket and corresponding clutch wheel 32 from a nonoperating position to an operating position wherein the clutch wheel engages the associated carrier roller 16 in driving engagement therewith. Each fluid pressure actuator 70 includes a rectangular housing 82 which may be mounted on a lower flange 20a of the frame member 20, as through a screw 84 and a support bracket 86, and is adapted to receive an actuator piston 88 therein for axial sliding movement. Each housing 82 defines a fluid pressure chamber 90 rearwardly of the associated piston 88, each pressure chamber being connected through a suitable pressure conduit 92 to a sensor control valve 94 of known design operative to control the introduction of fluid pressure into the chamber 90 so as to extend the associated piston 88 outwardly from the housing 82.

As best seen in FIGS. 1 and 2, article sensor means in the form of sensor arms 96 are provided along the length of the conveyor frame member 20 so that at least one sensor arm is disposed within each conveyor zone and projects into the path traversed by packages conveyed along the length of the conveyor. In the embodiment illustrated in FIG. 1, four conveyor zones 100a, b, c and d are indicated along the length of the conveyor with each zone having six article carrier rollers 16 therein and a single article sensor arm 96 positioned generally adjacent the forward end of each zone. Thus, three drive means 30 are disposed within each conveyor zone operatively associated with alternate article carrier rollers in the zone.

Each of the article sensor arms 96 is pivotally mounted on and forms a part of an associated sensor control valve 94. Each of the sensor control valves 94 is connected through a suitable fluid pressure conduit (not shown) to a source of pneumatic pressure, such as an air compressor or pressure tank (not shown), and is also connected to the three fluid pressure actuators 70 disposed within the next upstream conveyor zone. The sensor control valves 94 are normally open between the pneumatic pressure source and the associated fluid pressure actuators 70 when their associated sensor arms 96 are not depressed by articles on the conveyor so that air pressure normally acts to extend the pistons 84 and effect driving engagement of the clutch wheels 32 with their associated carrier rollers 16.

In the operation of the accumulator conveyor illustrated in FIGS. 1-5, the drive means (not shown) for the drive belt 60 is energized to effect rotation of the clutch wheels 32. Simultaneously, fluid pressure is introduced into the chambers 90 of the actuators 70 to extend the pistons 84 and effect driving engagement of the clutch wheels with their associated article carrier rollers 16. Articles or cartons placed on the conveyor are conveyed therealong by the driven carrier rollers 16. As aforementioned the sensor arms 96 are positioned so as to be momentarily depressed as an article passes over the sensor arm during movement through the associated conveyor zone. Momentary depression of any one of the sensor arms causes a slight but hardly perceptible interruption of fluid pressure to the associated fluid pressure actuators 70 in the zone next adjacent and upstream from the depressed sensor arm so that disengagement of the associated clutch wheels 32 is merely momentary and not appreciable.

When an article or carton, such as indicated at 12a, is stopped on the conveyor such as by a manually controllable stop 104, the underlying sensor arm 96 is depressed to close the associated sensor control valve 94 which, when closed, is adapted to release air from the chambers 90 of the associated fluid pressure actuators 70 in zone 100c. Releasing air pressure from the actuators 70 permits the associated clutch springs 80 to pivot the clutch brackets 36 and associated clutch wheels 32 downwardly to disengage the clutch wheels from their associated carrier rollers 16 and cause the article 12b to stop. As the clutch wheels 32 in zone 100c are disengaged from their associated carrier rollers 16, the article disposed within zone 100c may, depending upon its mass and moving velocity, continue slight forward movement under its own inertia but will engage the stopped carton 12a, if at all, with substantially zero pressure contact thereagainst.

As the article 12b is stopped, it in turn depresses the associated sensor arm 96 disposed within zone 100c to deenergize the actuators 70 in zone 100d whereby to disengage the associated clutch wheels from their corresponding carrier rollers 16 and interrupt driving movement of the article disposed within zone 100d. This action continues progressively along the conveyor to stop movement of all articles on the conveyor. It will be appreciated that in any zone in which a manually operated stop, such as stop 104, is disposed, such stop would also be made to control the actuators 70 disposed in the zone in which the stop is located.

When the first article in the chain of accumulated stopped articles on the conveyor is again allowed to progress forwardly, such as by the operator lowering the stop 104, the sensor arm 97 underlying the now forwardly moving article is returned to its upward position by means such as spring 106 to again open the associated control valve 94 and pressurize the corresponding fluid pressure actuators 70 in zone 100c whereby to effect reengagement of the associated clutch wheels 32 with their overlying carrier rollers 16 and effect a corresponding forward movement of article 12b. Forward movement of the article 12b releases the underlying sensor arm 96 to energize the fluid pressure actuators 70 in zone 100d and effect forward movement of the article 12c. This action continues progressively along the conveyor to again obtain progressive movement of articles on the conveyor.

It will be appreciated that while the embodiment illustrated in FIGS. 1-5 has been described as employing actuator means 68 in the form of fluid pressure actuators 70 to effect movement of the clutch wheels 32 from inoperative to operative positions relative to the associated article carrier rollers 16, mechanical linkage means could be employed to effect movement of the clutch wheels 32 between their operating and nonoperating positions relative to the associated driven carrier rollers in response to actuation of sensor arms engaged by articles being conveyed along the conveyor.

As aforementioned, during periods of heavy duty operation, it is a preferable practice to effect driving rotation of all of the carrier rollers 16 on the conveyor. FIGS. 6 and 7 illustrate an alternative embodiment of drive means for the carrier rollers 16 wherein a clutch wheel 32' is positioned so as to engage two adjacent carrier rollers 16. The clutch wheel 32' is mounted on a clutch bracket 36' through a support shaft 34' and with the clutch bracket being pivotally mounted on an associated conveyor side frame member 20' to facilitate movement of the clutch wheel 32' between a nonoperating position spaced from the associated pair of carrier rollers 16 and a position engaging both of the adjacent carrier rollers. A fluid pressure actuator 70' is operatively associated with each clutch bracket 36' in similar fashion to the aforedescribed embodiment illustrated in FIGS. 1-5.

The embodiment shown in FIGS. 6 and 7 differs slightly from the embodiment illustrated in FIGS. 1-5 through the employment of adjustable biasing means 110. The biasing means 110 includes a threaded rod 112 received through a suitable opening 114 in the frame member 20' and having adjustable threaded connection with a nut 116 fixed to the V-shaped bracket 76' of the clutch bracket 36'. A clutch spring 80' is disposed coaxially over the outer end of the rod 112 between an enlarged head 112a thereon and the outer surface of the frame member 20' so as to bias the clutch bracket 36' and associated clutch wheel 32' to their downward inoperative pivotal positions relative to the associated carrier rollers 16. In other respects, the embodiment illustrated in FIGS. 6 and 7 is substantially identical in function and operation to the aforedescribed clutch wheels 32 and associated fluid pressure control means. The fluid pressure actuator 70' could also alternatively comprise mechanical linkage means operative to selectively control pivotal movement of the clutch bracket 36' and associated clutch wheel 32'.

In the operation of the embodiments illustrated in FIGS. 1-5 and FIGS. 6 and 7, as the clutch wheels are moved to their upward operating positions, the frustoconical drive surfaces on the clutch wheels effect progressively increasing area contact with the associated driven article carrying rollers 16 so that progressively increasing frictional contact is obtained between the clutch wheels and the associated driven carrier rollers. This action causes a gradual force loading of the driven clutch wheels and effects smoother overall operation of the accumulator conveyor. The drive belt 60 maintains its driving relation with the clutch wheels during full movement of the clutch wheels without engaging the carrier rollers 16.

As aforenoted, the described carrier rollers 16 and associated clutch wheels 32 may also be mounted on frame members forming a curved section of the conveyor. The clutch wheels could be similarly pivotally mounted so as to effect driving engagement with one or a pair of carrier rollers on the curved track section and pneumatically controlled in the aforedescribed manner.

The clutch wheels on such a curved conveyor section would be continually rotatably driven by the same drive belt means employed in the straight conveyor sections, the belt means being supported through the curved conveyor section by conventional means.

While preferred embodiments of the present invention have been illustrated and described, it will be understood to those skilled in the art that changes and modifications may be made therein without departing from the invention in its broader aspects.

Various features of the invention are defined in the following claims.

What is claimed is:

1. An accumulator conveyor comprising, in combination,
    frame means including a pair of longitudinal laterally spaced frame members,
    a plurality of article carrier rollers, defining a path of travel and supported by said frame means for rotation about axes substantially transverse to said path, said carrier rollers defining at least two discrete zones of rollers,
    drive means operatively associated with each discrete zone and adapted to effect driving rotation of at least one of the carrier rollers in the corresponding zone so as to effect movement of an article having engagement with said rotationally driven roller in said corresponding zone,
    each drive means including a clutch wheel having a frustoconical peripheral drive surface, support bracket means supported by one of said frame members for pivotal movement about a pivot axis substantially parallel to said path of travel and supporting said clutch wheel for rotation about an axis lying in a plane substantially normal to a plane containing the axes of said carrier rollers and for pivotal movement with said support bracket means between a position wherein said peripheral drive surface of said clutch wheel engages at least one carrier roller in the corresponding zone with said peripheral drive surface substantially parallel to the rotational axis of said carrier roller, and a position wherein said clutch wheel is spaced from said at least one carrier roller, and means operatively associated with said clutch wheel for effecting continuous rotation thereof,
    and control means including sensor means associated with each of said discrete zones and adapted to be actuated by an article disposed within the corresponding zone, and actuator means operatively associated with each of said support bracket means and being responsive to actuation of sensor means within a selected one of the other zones to disengage an associated clutch wheel within a zone upstream from the zone in which an article is detected so as to stop driven movement of an article disposed within said upstream zone when an article is halted within said selected one of said other zones.

2. An accumulator conveyor as defined in claim 1 wherein each of said support bracket means comprises a clutch bracket pivotally mounted on a selected one of said longitudinal frame members for pivotal movement about a generally fixed pivot axis substantially parallel to said path of travel.

3. An accumulator conveyor as defined in claim 2 wherein each of said clutch brackets has a hinge tab formed thereon received through an opening in the selected one of said longitudinal frame members and retained therein so as to be pivotable about a pivot axis substantially parallel to said path of travel.

4. An accumulator conveyor as defined in claim 1 wherein each clutch wheel support bracket means includes means facilitating manual adjustment of the axis of the associated clutch wheel relative to its associated carrier roller.

5. An accumulator conveyor as defined in claim 1 wherein each actuator means comprises a fluid pressure actuator, said control means further including a sensor control valve operatively associated with the fluid pressure actuator of each of said discrete zones and adapted to connect the associated fluid pressure actuator to a source of fluid pressure, each of said sensor control valves having operative association with sensor means in a zone different from the zone in which its associated fluid pressure actuator is located.

6. An accumulator conveyor as defined in claim 5 wherein each of said zone includes a plurality of carrier rollers, said drive means associated with each zone including at least two clutch wheels adapted for driving relation with different ones of said carrier rollers within the corresponding zone, said control means including a fluid pressure actuator operatively associated with each of said clutch wheels in each zone, each sensor control valve being adapted to connect all of the fluid pressure actuators within a zone to a source of fluid pressure and having operative association with sensor means disposed in a different zone.

7. An accumulator conveyor as defined in claim 1 wherein each of said clutch wheels and associated support bracket means are positioned so that each clutch wheel is adapted to engage a pair of adjacent carrier rollers in driving relation therewith.

8. An accumulator conveyor as defined in claim 1 wherein the sensor means in at least one of said conveyor zones has operative association with the actuator means in said one of said zones so as to effect disengagement of the clutch wheels disposed within said one of said zones from their associated carrier rollers when an article is stopped within said one of said zones.

9. An accumulator conveyor as defined in claim 1 wherein said means for effecting continuous rotation of said clutch wheel includes drive belt means.

10. An accumulator conveyor as defined in claim 9 wherein said drive belt means has operative association with all of said clutch wheels so as to effect simultaneous rotation thereof.

11. An accumulator conveyor as defined in claim 10 wherein said drive belt means comprises an endless drive belt supported by said frame means and having a reach extending substantially transverse to said clutch wheels in driving engagement therewith.

12. An accumulator conveyor as defined in claim 1 including means biasing each of said clutch wheel support bracket means toward positions wherein the associated clutch wheels are spaced from their corresponding carrier rollers.

13. An accumulator conveyor as defined in claim 12 wherein said biasing means is adjustable to selectively vary the biasing force acting on said clutch wheel support bracket means.

14. In a conveyor having a plurality of article support rollers rotatably supported on frame means and defining a path of travel for articles disposed thereon, said frame means including a pair of laterally spaced longitudinal frame members, the combination therewith comprising drive means operatively associated with at least one of the article support rollers and adapted to effect driving rotation thereof, said drive means including a clutch wheel having a frustoconical peripheral drive surface, support bracket means supporting said clutch wheel for rotation about its longitudinal axis with said longitudinal axis lying in a plane substantially perpendicular and transverse to said path of travel, said support bracket means being pivotally mounted on one of said frame members and movable about a generally fixed pivot axis substantially parallel to the path of travel defined by said support rollers between a first position wherein said clutch wheel is spaced from the associated article support roller and a second position wherein said clutch wheel engages said associated support roller in driving relation therewith, said support bracket means and said clutch wheel being adapted to position said clutch wheel so that its peripheral drive surface is substantially parallel to the axis of said associated support roller when said clutch wheel is in said driving relation therewith, and means operatively associated with said clutch wheel and adapted to effect driving rotation thereof so as to effect driving rotation of said associated support roller when said clutch wheel is in driving relation therewith.

15. The combination as defined in claim 14 wherein said clutch wheel has an annular groove formed therein facilitating driving connection of said clutch wheel with a drive belt.

16. The combination as defined in claim 14 including actuating means operatively associated with said support bracket means and operative to effect selective pivotal movement thereof about said pivot axis.

17. The combination as defined in claim 16 including means biasing said support bracket means toward a pivotal position wherein said clutch wheel is disposed in its said first position.

18. The combination as defined in claim 14 wherein said drive means includes a driven endless belt, said clutch wheel having an annular groove therein having continual cooperation with said driven belt so as to effect rotation of said clutch wheel, said clutch wheel and driven belt having cooperating relation so that said belt does not engage said article support rollers during operation of the conveyor.

19. An accumulator conveyor comprising, in combination,
frame means,
a plurality of article carrier rollers defining a path of travel and supported by said frame means for rotation about axes substantially transverse to said path, said carrier rollers defining at least two discrete zones of rollers,
drive means operatively associated with at least one of said discrete zones and adapted to effect driving rotation of at least one of the carrier rollers in the corresponding zone so as to effect movement of an article having engagement with said rotationally driven roller in said corresponding zone,
said drive means including a clutch wheel having a frustoconical peripheral drive surface, means supporting said clutch wheel for rotation about an axis lying in a plane substantially normal to a plane containing the axes of said carrier rollers and for pivotal movement about a pivot axis substantially parallel to said path of travel between a position wherein said clutch wheel directly engages said at least one carrier roller in the corresponding zone and a position spaced from said at least one carrier roller, said support means and said clutch wheel being adapted to position said clutch wheel so that its peripheral drive surface is substantially parallel to the axis of said at least one carrier roller when said clutch wheel is moved into driving engagement with said at least one carrier roller from a position spaced therefrom,
means operatively associated with said clutch wheel for effecting continuous rotation thereof,
and control means including sensor means associated with each of said discrete zones and adapted to be actuated by an article disposed within the corresponding zone, and actuator means operatively associated with each of said clutch wheel support means and being responsive to actuation of sensor means within a selected one of the other zones to disengage an associated clutch wheel within a zone upstream from the zone in which an article is detected so as to stop driven movement of an article disposed within said upstream zone when an article is halted within said selected one of said other zones.

20. An accumulator conveyor as defined in claim 19 wherein said peripheral drive surfaces are defined by relatively high coefficient of friction surfaces formed on said clutch wheels.

* * * * *